United States Patent
Wang et al.

(10) Patent No.: US 10,490,787 B2
(45) Date of Patent: Nov. 26, 2019

(54) BATTERY FIXING BRACKET AND BATTERY PACK

(71) Applicant: NIO NEXTEV LIMITED, Hong Kong (CN)

(72) Inventors: Feng Wang, Shanghai (CN); Zhongle Wei, Shanghai (CN); Tianming Tang, Shanghai (CN); Yulin Tao, Shanghai (CN)

(73) Assignee: NIO NEXTEV LIMITED, Hong Kong (CN)

( * ) Notice: Subject to any disclaimer, the term of this patent is extended or adjusted under 35 U.S.C. 154(b) by 52 days.

(21) Appl. No.: 15/707,505

(22) Filed: Sep. 18, 2017

(65) Prior Publication Data
US 2018/0083236 A1 Mar. 22, 2018

(30) Foreign Application Priority Data
Sep. 19, 2016 (CN) .......................... 2016 1 0829250

(51) Int. Cl.
*H01M 2/10* (2006.01)
*H01M 10/04* (2006.01)
*H01M 10/42* (2006.01)
*H01M 2/20* (2006.01)

(52) U.S. Cl.
CPC ......... *H01M 2/1016* (2013.01); *H01M 10/04* (2013.01); *H01M 10/425* (2013.01); *H01M 2/202* (2013.01)

(58) Field of Classification Search
CPC ..... H01M 2/1016; H01M 10/42; H01M 10/46
See application file for complete search history.

(56) References Cited

U.S. PATENT DOCUMENTS

| 6,224,998 B1 * | 5/2001 | Brouns | B60R 16/04 429/100 |
| 2008/0280195 A1 * | 11/2008 | Kumar | H01M 2/1077 429/100 |
| 2014/0199573 A1 | 7/2014 | Cho et al. | |

FOREIGN PATENT DOCUMENTS

| CN | 102034948 | 4/2011 |
| CN | 203707209 | 7/2014 |
| CN | 105845854 | 8/2016 |

(Continued)

OTHER PUBLICATIONS

Search Report for China Patent Application No. 2016108292505, dated Dec. 20, 2017, 2 pages.

(Continued)

*Primary Examiner* — Olatunji A Godo
(74) *Attorney, Agent, or Firm* — Sheridan Ross P.C.

(57) ABSTRACT

The invention relates to a battery fixing bracket and a battery pack comprising the same. A substrate of the battery fixing bracket has a rectangular shape and battery receiving spaces are defined in the substrate, the battery receiving spaces are uniformly arranged in a form of matrix in the substrate, and a through hole slightly smaller than battery end face is formed at the bottom of each battery receiving space; snap strips and snap grooves adjacent to four corners are integrally formed at sides of the battery fixing bracket, the snap strips and the snap grooves have mating shapes, and are alternately arranged in a circumferential direction of the battery fixing bracket; and a connecting hole is disposed in the middle portion of the battery fixing bracket in a perpendicularly penetrating manner.

15 Claims, 4 Drawing Sheets

(56) References Cited

FOREIGN PATENT DOCUMENTS

| | | |
|---|---|---|
| CN | 105938887 | 9/2016 |
| CN | 106207043 | 12/2016 |
| CN | 206040765 | 3/2017 |
| DE | 102011114526 | 4/2013 |

OTHER PUBLICATIONS

International Search Report for International (PCT) Patent Application No. PCT/CN2017/092989, dated Oct. 16, 2017, 3 pages.

* cited by examiner

BATTERY FIXING BRACKET AND BATTERY PACK

CROSS-REFERENCE TO RELATED APPLICATIONS

This application claims the benefit of China Patent Application 201610829250.5 filed Sep. 19, 2016, the contents of which are incorporated herein by reference.

FIELD OF THE INVENTION

The invention relates to the technical field of battery pack energy storing; more specifically, the invention relates to a battery fixing bracket and further to a battery pack comprising the same.

BACKGROUND

An energy storing system is adapted to be used as a backup power supply when the mains power is shut down, and is widely used at home, schools, hospitals, factories, vehicles and various workplaces. In these suitable places, energy storing system does not subject to long-time vibration in most situations.

The battery pack is a core component of the energy storing system. The main structure of a common battery pack comprises a battery fixing bracket composed of an upper cap and a lower cap, current-carrying sheets, batteries and insulation sheets, etc.

In the prior art designs, for the battery pack, battery fixing brackets with different specifications are typically designed according to the required capacity. Especially in the process of manufacturing a sample, such a design will increase the cost of developing a mold at an early stage, and will also prolong the period of developing the entire system.

In addition, batteries are assembled by using an upper cap and a lower cap in existing battery fixing brackets, and are then fixed by welding using nickel sheets. As such, a professional clamp is required during welding for fixing, and there is a risk of breaking the welding spots during the movement of battery pack after welding.

SUMMARY OF THE INVENTION

An object of the invention is to provide a battery fixing bracket that can overcome the above described technical problems.

Further, the object of the invention also lies in providing a battery pack which comprises the above described battery fixing bracket.

In order to realize the above objects, a first aspect of the invention provides a battery fixing bracket, wherein a substrate of the battery fixing bracket has a rectangular shape and battery receiving spaces are defined in the substrate, the battery receiving spaces are uniformly arranged in a form of matrix in the substrate, and a through hole slightly smaller than battery end face is formed at the bottom of each battery receiving space;

snap strips and snap grooves adjacent to four corners are integrally formed at sides of the battery fixing bracket, the snap strips and the snap grooves have mating shapes, and are alternately arranged in a circumferential direction of the battery fixing bracket; and a connecting hole is disposed in the middle portion of the battery fixing bracket in a perpendicularly penetrating manner.

Optionally, in the above described battery fixing bracket, the matrix is a 2*2 matrix or a 3*3 matrix.

Optionally, in the above described battery fixing bracket, the snap strips and the snap grooves at the same side of the battery fixing bracket are at different height positions.

Optionally, in the above described battery fixing bracket, the snap strips and the snap grooves have a dove-tail shape.

Optionally, in the above described battery fixing bracket, corresponding connection portions are formed at opposite sides of the battery fixing bracket.

Optionally, in the above described battery fixing bracket, the battery receiving spaces are defined by battery snap struts arranged in a form of matrix, and every four adjacent battery snap struts define one battery receiving space.

Optionally, in the above described battery fixing bracket, a side face of the battery snap strut that faces the battery receiving space has a consistent shape with the side face of the battery.

Optionally, in the above described battery fixing bracket, the battery has a columnar shape, and a side face of the battery snap strut that faces the battery receiving space has an arc shape.

Optionally, in the above described battery fixing bracket, the battery snap strut comprises:

first snap struts located at a middle position of the substrate and positioned between four adjacent battery receiving spaces, the connection hole being located in the first snap struts;

second snap struts located at an edge position of the substrate and having a shape that is half of the first snap strut; and third snap struts located at four corners of the substrate and having a shape that is ¼ of the first snap strut, the snap strips and the snap grooves being located at the third snap struts.

Optionally, in the above described battery fixing bracket, a raised portion is formed at a top end of the first snap strut, and the raised portion has an anti-rotation structure.

Optionally, in the above described battery fixing bracket, the anti-rotation structure is a circular sector shaped or annular sector shaped protrusion.

Optionally, in the above described battery fixing bracket, connection portions are formed at an outside of the second snap strut.

In order to achieve the above objects, a second aspect of the invention provides a battery pack which comprises an upper cap assembly and a lower cap assembly formed by a battery fixing bracket according to any of the above first aspect, and the upper cap assembly and the lower cap assembly are aligned oppositely and fixed via screws in the connection holes;

batteries are disposed between the upper cap assembly and the lower cap assembly, and pole ends of the batteries are received in the battery receiving spaces of the upper cap assembly and the lower cap assembly respectively; current-carrying sheets are disposed between the batteries and the upper cap assembly as well as between the batteries and the lower cap assembly, and electrodes of the batteries are welded to the current-carrying sheets, and insulation sheets are attached to the upper cap assembly.

Optionally, in the above described battery pack, each current-carrying sheet and each insulation sheet have a shape and an area consistent with those of the corresponding battery fixing bracket.

Optionally, in the above described battery pack, the battery pack has connection strips that are connected and fix the corresponding connection portions at the edges of the upper cap assembly and the lower cap assembly relative to each other.

The battery fixing bracket of the invention provides a simple and convenient way of grouping a battery pack. At an early stage of developing an energy storing system, according to different requirements on capacity, a sample can be made in a simple and convenient way by assembling, thus reducing the time and cost involved in developing.

BRIEF DESCRIPTION OF THE DRAWINGS

The disclosure of the invention will become more apparent from the accompanying drawings. It should be understood that these drawings are provided merely for illustrative purpose, rather than limiting the scope of protection of the invention, wherein.

DETAILED DESCRIPTION OF THE INVENTION

Specific embodiments of the invention will be described below with reference to the accompanying drawings, where identical or corresponding technical features are denoted by identical reference signs throughout the drawings.

Figure 1:
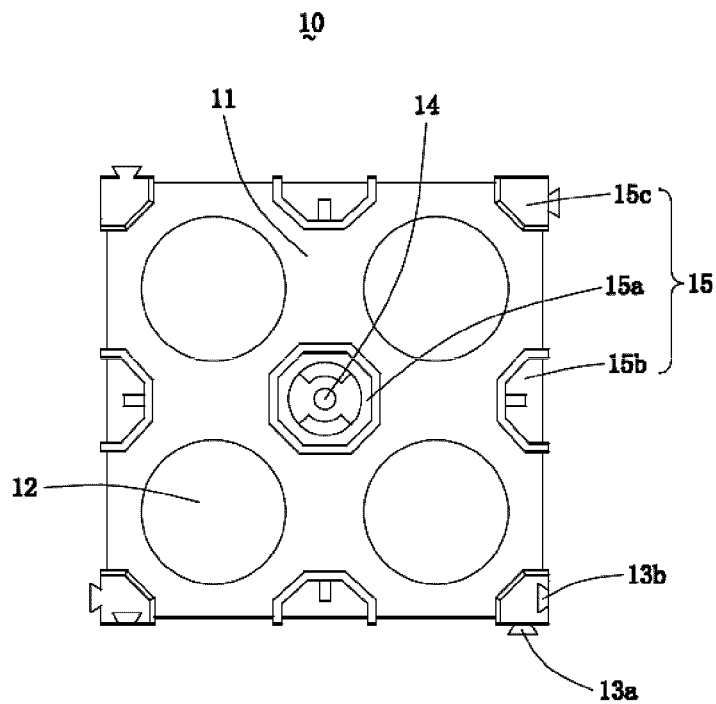
FIG. 1 shows a schematic plan view of a battery fixing bracket according to an embodiment of the invention.
Figure 2:
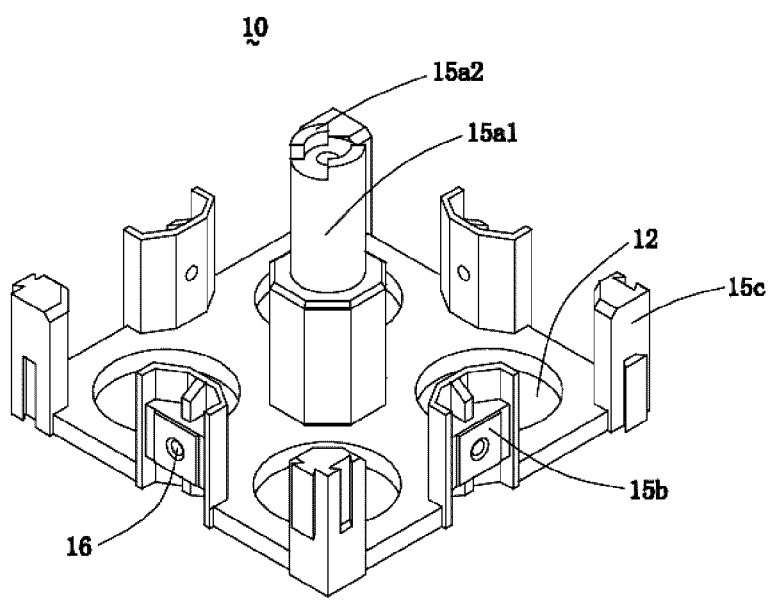
FIG. 2 shows a schematic perspective view of the battery fixing bracket shown in FIG. 1.

FIG. 1 and FIG. 2 show a schematic plan view and a schematic perspective view of a 2*2 battery fixing bracket 10 according to an embodiment of the invention respectively.

As shown, the battery fixing bracket 10 may comprise a substrate 11 and battery struts 15 that are formed integrally. The battery struts 15 may comprise first snap struts 15a, second snap struts 15b and third snap struts 15c, surrounding several battery receiving spaces in the substrate 11.

The substrate 11 of the battery fixing bracket 10 can have a rectangular shape and is optionally made from plastic sheet plate. Specifically, in the illustrate example, the substrate 11 of the battery fixing bracket is of a square shape. Snap strips 13a and snap grooves 13b are designed at four sides of the substrate 11. When different battery fixing brackets 10 are juxtaposed, they can be spliced together by these snap strips 13a and snap grooves 13b so as to form an upper cap assembly and a lower cap assembly of the battery pack. The number of the battery fixing brackets 10 can be selected as require so as to have a Flexible size.

In the illustrated embodiment, 3*3 battery snap struts 15 are disposed on the substrate 11 of the battery fixing bracket 10, which comprises the first snap struts 15a, the second snap struts 15b and the third snap struts 15c. These battery snap struts can be uniformly distributed in a form of matrix. With this uniform arrangement of matrix, it can be seen that the battery fixing bracket has a symmetrical structure.

As shown, the battery snap struts 15 can be formed integrally with the substrate 11. Every four adjacent battery snap struts 15 surround one battery receiving space in the substrate 11, and the battery can be just received and positioned in the battery receiving space. It can be understood that in other embodiments, battery snap struts having a different number, different shape and/or different arrangement can by employed to surround battery receiving spaces, without being limited to the illustrated four adjacent battery snap struts 15.

As shown, in the illustrated embodiment, there are four battery receiving spaces defined in the substrate 11, and these battery receiving spaces are also uniformly arranged in a form of matrix in the substrate 11. In the figure, the matrix is a 2*2 matrix and has a square pattern. Likewise, other numbers of battery receiving spaces can be also formed on the battery fixing bracket 10. In order for dissipating heat for the batteries and for a contact between pole ends of the batteries and the current carrying sheets, a through hole 12 slightly smaller than the end face of battery is formed at the bottom of each battery receiving space. The through hole 12 is slightly smaller than the end face of battery so as to prevent the battery from falling. Preferably, the through hole 12 can be the circular hole as shown; those skilled in the art can also consider other shapes.

As shown, the first snap strut 15a is located at a middle position of the substrate 11, and is positioned between four adjacent battery receiving spaces. The second snap struts 15b are located at edge positions of the substrate 11 and have a shape that is a half of the first snap strut 15a. The third snap struts 15c are located at four corners of the substrate 11 and have a shape that is ¼ of the first snap strut 15a. With this arrangement, when a plurality of battery fixing brackets 10 according to this embodiment are spliced using snap strips 13a and snap grooves 13b, two adjacent second snap struts 15b and four adjacent third snap struts 15c will constitute a configuration that is similar to the first snap strut 15a, which is advantageous for ensuring a uniform arrangement of batteries of the spliced battery fixing brackets in the battery pack. Specifically, in the drawings, the first snap strut optionally has an octagon shape, the second snap strut has a shape that is half of octagon, and the third snap strut has a shape that is ¼ of octagon. It can be understood that two second snap struts and four third snap struts can respectively be spliced together, which is also advantageous for increasing their strength and improving the reliability of receiving batteries.

Side faces of the battery snap struts 15a, 15b and 15c that face the battery receiving spaces preferably have a shape that is consistent with the side faces of batteries for facilitating a surface contact between them. For example, in the illustrated embodiment, the battery fixing bracket 10 can be suitable for columnar batteries, for example, without limitation to, batteries 14430, 18650, 26650 and 32650, etc. In this situation, the side faces of the battery snap struts that face the battery receiving spaces preferably have an arc shape which correspond to the side faces of the batteries; more preferably, the radius of the arc shape on the side face of the battery snap strut 15 is substantially equal to or slightly larger than the radius of the arc shape on the side face of the battery so as to facilitate assembling while also preventing the battery snap struts from crushing the batteries. It can be understood that when other shapes such as square shape or the like are selected for the batteries, a shape corresponding to that selected for the side face of the battery can be selected for the side face of the battery snap strut so as to realize a surface contact between the battery snap strut and the battery. The surface contact between the battery snap strut and the battery will be advantageous for the stability of placing batteries in the battery fixing bracket so as to prevent the batteries from being damaged due to overpressure caused by the fact that an area between the battery snap strut and the battery is too small.

Snap strips 13*a* and snap grooves 13*b* are formed integrally with sides of the battery fixing bracket 10 near the four corners. The snap strips 13*a* and snap grooves 13*b* having mating shapes that are adapted to be engaged with each other, and are alternately disposed in a circumferential direction of the battery fixing bracket 10. It can be seen that when two identical battery fixing brackets 10 are juxtaposed, the snap struts of one battery fixing bracket can be inserted into the snap grooves of the other one so that the two battery fixing brackets 10 are spliced together. As shown in the figures, the snap strip 13*a* and the snap grooves 13*b* preferably have a dove-tail shape. Optionally, the snap struts and the snap grooves can also use a mortise/tenon structure. Since the energy storing battery pack typically does not need to vibrate for a long time, a common snapping structure can meet requirements.

In order to facilitate assembling and disassembling, in the illustrated embodiment, it is also preferable to set the snap strip 13*a* and the snap groove 13*b* at the same side of the battery fixing bracket 10 at different height positions. As can be seen from the illustrated embodiment, an upper end of the higher one of the snap strip 13*a* and the snap groove 13*b* is flush with an upper end of the snap strut, and a lower end of the lower one of the snap strip 13*a* and the snap groove 13*b* is flush with a lower end of the substrate. In the illustrated embodiment, the snap strip 13*a* and the snap groove 13*b* are preferably located at the position of the third snap strut 15*c*. With this arrangement, the interference during the engagement of the snap strip/snap groove at the same side of the battery fixing bracket is alleviated, a more flexible installation angle is provided, and the force required during assembly is reduced. In addition, the stop ends of the snap strip and snap groove define a relative installation position of the battery fixing bracket, and the accuracy in splicing the battery fixing brackets is ensured.

As can be seen from the drawings, a raised portion 15*a*1 can be formed on a top end of the first snap strut 15*a*, and the raised portion 15*a*1 has an anti-rotation structure 15*a*2. The anti-rotation structure 15*a*2 functions as follows: when the battery fixing brackets are assembled as the upper cap assembly and the lower cap assembly of the battery pack respectively and form the battery pack together with the batteries, the current-carrying sheets and the insulation sheets, the anti-rotation structures in the battery fixing brackets of the upper and lower cap assemblies can engage together so as to prevent corresponding battery fixing brackets from rotating relative to each other. In the example as shown, the anti-rotation structure 15*a*2 can be a circular sector shaped or annular sector shaped protrusion. This circular sector or annular sector shaped arrangement requires that the two battery fixing brackets are allowed to be engaged with each other when they are flipped and oppositely disposed in the battery pack. It can be understood that the number of the circular sector shaped or annular sector shaped protrusions is limited to 2 as shown.

In order that the corresponding battery fixing brackets constituting the upper and lower cap assemblies can be fastened together, a connection hole 14 can be disposed in the middle portion of the battery fixing bracket 10 in a perpendicularly penetrating manner. The connection hole 14 can also be a threaded hole. Preferably, the connection hole can be located on a mirror-symmetrical axis of the battery fixing bracket so that the connection holes of the opposed battery fixing brackets are located at aligned positions and screws, bolts, studs or the like can be used for fastening; in case that the connection hole does not have internal threads, a tapping screw can be used for fixing. In the illustrate example, the connection hole is formed in the first snap strut. A bolt can pass through the connection hole for fixing the upper and lower cap assemblies together. In order to further fix the opposed battery fixing brackets, connection portions 16 can be also formed oppositely at sides of the battery fixing brackets 10. In the illustrated embodiment, the connection portions 16 are preferably located in the connection holes at the outside of the second snap struts.

After the battery pack is assembled, strip-like members can be used to connect the battery fixing brackets together that are spliced side by side or juxtaposed vertically. When more battery packs are spliced or juxtaposed, lengthened strip-like members can be used to connect a plurality of connection portions. Those skilled in the art can conceive of other forms of connection portions, for example, but without limitation to, recesses, etc. A detail description is not given herein.

Figure 3:
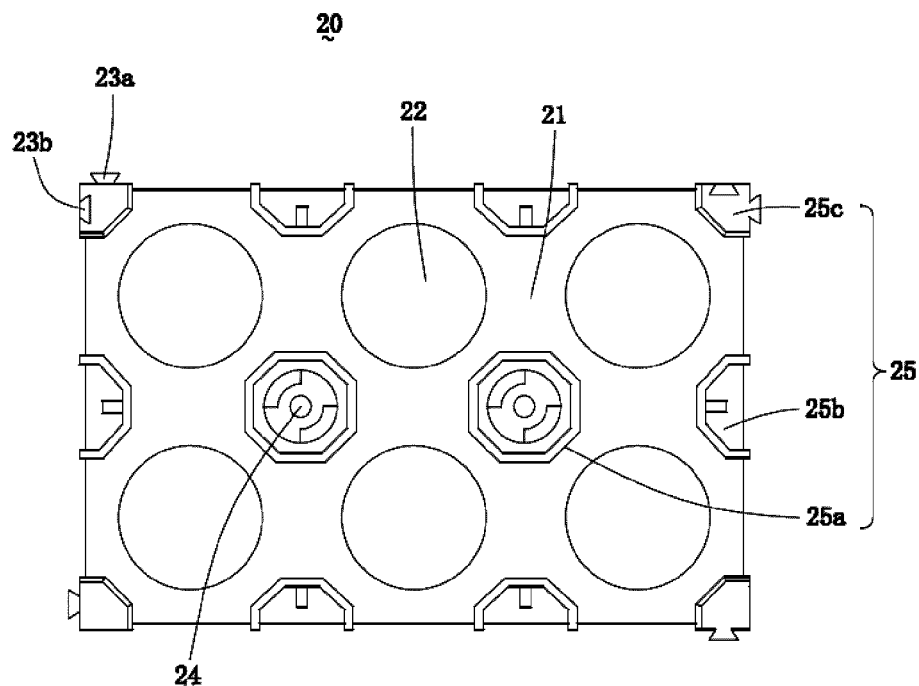
FIG. 3 shows a schematic plan view of a battery fixing bracket according to another embodiment of the invention.
Figure 4:
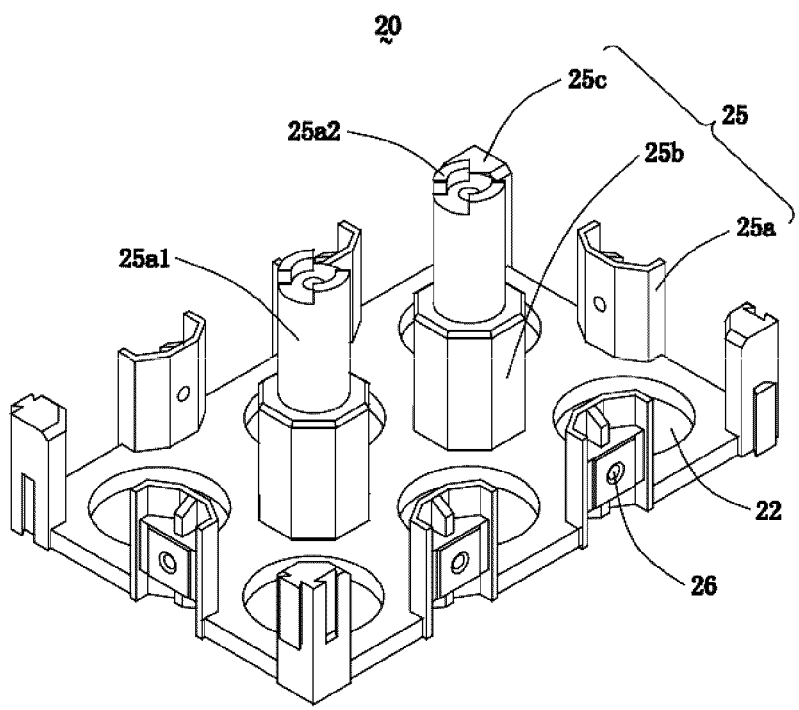
FIG. 4 shows a schematic perspective view of the battery fixing bracket shown in FIG. 3.

FIG. 3 and FIG. 4 show a schematic plan view and a schematic perspective view of a 3*3 battery fixing bracket 20 according to another embodiment of the invention respectively.

As shown in the figure, the illustrated battery fixing bracket 20 is of a rectangle shape as a whole, and has a mirror-symmetrical structure. The battery fixing bracket 20 may have 3*4 battery snap struts 25, comprising two first snap struts 25*a* located at a middle portion of the substrate 21, six second snap struts 25*b* located at edges of the substrate 21, and four third snap struts 25*c* located at corners of the substrate 21. These battery snap struts 25 can be uniformly arranged in a matrix, and can surround 2*3 battery receiving spaces that are uniformly arranged in a matrix. Similar to the embodiment in FIGS. 1 and 2, connection portions 26 can be formed in the second snap struts 25*b*; a raised portion 25*a*1 and an anti-rotation structure 25*a*2 are formed in the first snap strut 25*a*; a connection hole 24 is also formed at the center of the first snap strut 25*a*. The battery fixing bracket 20 of this embodiment is also provided with through holes 22, snap strips 23*a*, snap grooves 23*b*, etc. The description based on the embodiment of FIGS. 1 and 2 is also applicable for the battery fixing bracket of FIGS. 3 and 4, and the sizes of corresponding features are consistent. Thus, a repeated description is not given herein.

The battery fixing bracket 10 of FIGS. 1 and 2 can be also spliced with the battery fixing bracket 20 of FIGS. 3 and 4. The side of the battery fixing bracket 10 has the same size as a shorter side of the battery fixing bracket 20 and their structures mate with each other. During splicing, it is only required to engage the side of the battery fixing bracket 10 with the shorter side of the battery fixing bracket 20. It can be understood that in view that 2 and 3 are the smallest prime numbers, with the 2*2 battery fixing bracket 10 and the 2*3 battery fixing bracket 20, m*n battery receiving spaces in various matrix arrangements can be realized, wherein m and n are integers larger than or equal to 2.

Figure 5:
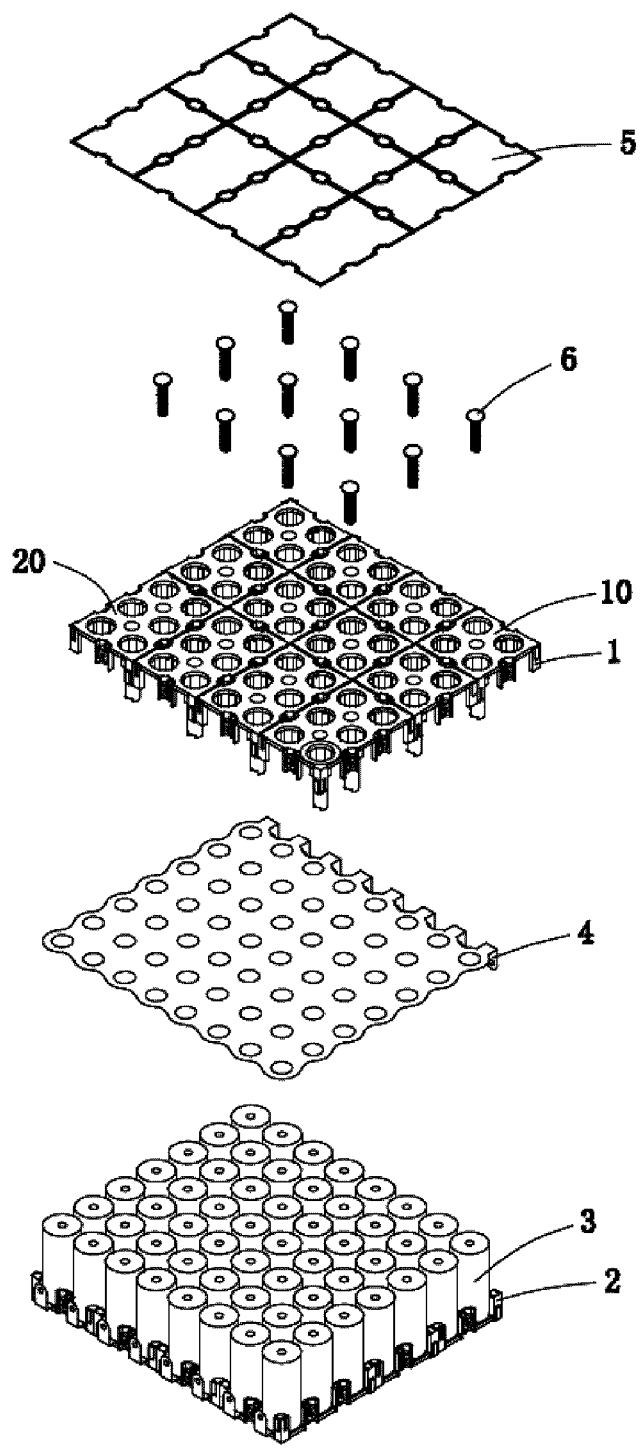
FIG. 5 shows a schematic exploded view of a battery pack according to an embodiment of the invention.
Figure 6:
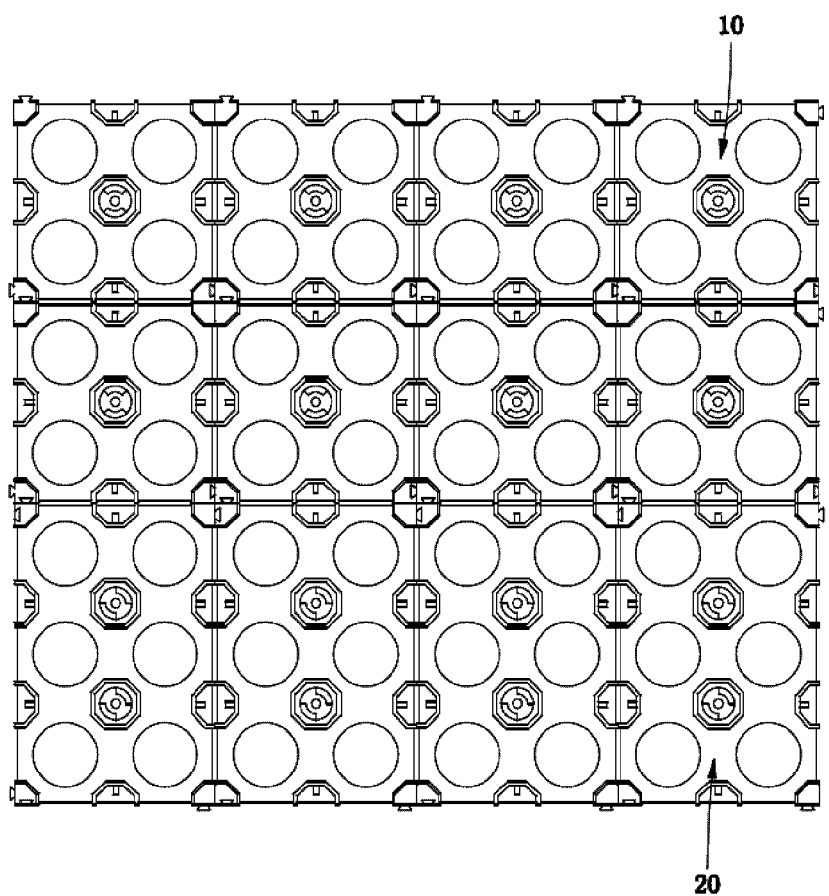
FIG. 6 shows an example of splicing the battery fixing bracket shown in FIG. 5.

FIG. 5 and FIG. 6 show a schematic exploded view and a schematic top view of a battery pack according to an embodiment of the invention respectively.

As shown, the battery pack can comprise an upper cap assembly 1 and a lower cap assembly 2 constituted by eight battery fixing brackets 10 and four battery fixing brackets 20 respectively. The upper cap assembly 1 and the lower cap assembly 2 are oppositely placed and are fixed by screws 6 in the connection holes. The sides of the upper cap assembly 1 and the lower cap assembly 2 can be also connected by strip-like members (not show) so as to enhance the stability. Batteries 3 are placed between the upper cap assembly 1 and the lower cap assembly 2. Pole ends of the batteries 3 are received in the battery receiving spaces of the upper cap assembly 1 and the lower cap assembly 2 respectively. Current-carrying sheets 4 are uniformly arranged between the batteries 3 and the upper cap assembly 1 as well as between the batteries 3 and the lower cap assembly 2. The electrodes of the batteries 3 can be welded to the current-carrying sheets 4, and insulation sheets 5 are attached to the upper cap assembly 1.

The insulation sheets 5 can be also designed to have the same size as the battery fixing bracket. As shown, the shape and area of each insulation sheet is consistent with the corresponding battery fixing bracket, e.g., a size of 2*2 and 2*3. In this way, the insulation sheet 5 can be attached accordingly based on the way how battery fixing brackets are spliced, thus increasing the flexibility.

Now, the method of assembling the battery pack will be described with reference to an example in which a 26650 column battery is used as the energy storing system. As can be known from FIG. 5, the battery pack mainly comprises an upper cap assembly 1, a lower cap assembly 2, batteries 3, current-carrying sheets 4 (e.g., copper-nickel composite sheets), insulation sheets 5 and fixing screws 6. The upper cap assembly 1 and the lower cap assembly 2 are constituted by corresponding numbers of 2*2 fixing brackets 10 and 2*3 fixing brackets 20 respectively. The specific numbers of the battery fixing brackets are determined by the capacity of system. The battery fixing brackets can be made from plastic materials.

With reference to FIGS. 5 and 6, during the assembly of the battery pack, the upper cap assembly 1 and the lower cap assembly 2 are firstly assembled as an overall frame by snapping the 2*2 fixing brackets 10 and the 3*3 fixing brackets 20 together; then, the current-carrying sheets 4 are placed in the lower cap assembly 2, and then batteries 3 are placed in sequence. As such, the batteries 3, the lower cap assembly 2 and the current-carrying sheets 4 form a new entirety altogether. Then, the upper cap assembly 1 having the current-carrying sheets 4 is mounted; finally, screws 6 are used to lock and fix the upper cap assembly 1 and the lower cap assembly 2, which are placed into a welding device for spot welding so that the pole ends of the batteries and the current-carrying sheets 4 are welded together. When it is confirmed "OK", the insulation sheets 5 are attached, thus forming the final battery pack. In addition, in order to ensure the stability after the battery pack is assembled, connection strips can be also used to fix the corresponding connection portions at the edges of the upper cap assembly and the lower cap assembly relative to each other. In this way, more assembled battery packs can be superimposed.

In the prior art battery pack, the battery fixing brackets mainly use non-assembled upper cap and lower cap to assemble the batteries, and then the upper cap and the lower cap are welded for fixing by nickel sheets. There is no bolt fixing therebetween, and there exists the risk of damaging weld spots during movement; moreover, in the prior art, after the design of battery pack is completed, a professional clamp is required during welding so as to realize fixation. In the invention, energy storing system having different capacities can be formed conveniently and quickly without lowering requirements in design, and the current-carrying sheets (e.g., nickel sheets, copper-nickel composite sheets) of the battery pack are inside a housing constituted by the battery fixing brackets; an entirety is formed after screwing. Therefore, no additional fixing clamps are required during welding.

The technical scope of the invention is not merely limited to the contents of the above description. Those skilled in the art can make various modifications and variations on the above embodiments without departing from the technical ideas of the invention, which will all fall within the scope of invention.

The invention claimed is:

1. A battery fixing bracket, comprising a substrate of the battery fixing bracket is of a rectangular shape and battery receiving spaces are defined in the substrate, the battery receiving spaces are uniformly arranged in a form of matrix in the substrate, and a through hole slightly smaller than a battery end face is formed at the bottom of each battery receiving space;

snap strips and snap grooves adjacent to four corners are integrally formed at sides of the battery fixing bracket, the snap strips and the snap grooves have mating shapes, and are alternately arranged in a circumferential direction of the battery fixing bracket; and a connecting hole is disposed in the middle portion of the battery fixing bracket in a perpendicularly penetrating manner.

2. The battery fixing bracket according to claim 1, wherein the matrix is a 2*2 matrix or a 3*3 matrix.

3. The battery fixing bracket according to claim 1, wherein the snap strips and the snap grooves at the same side of the battery fixing bracket are at different height positions.

4. The battery fixing bracket according to claim 1, wherein the snap strips and the snap grooves have a dove-tail shape.

5. The battery fixing bracket according to claim 1, wherein corresponding connection portions are formed at opposite sides of the battery fixing bracket.

6. The battery fixing bracket according to claim 1, wherein the battery receiving spaces are defined by battery snap struts arranged in a form of matrix, and every four adjacent battery snap struts define one battery receiving space.

7. The battery fixing bracket according to claim 6, wherein a side face of the battery snap strut that faces the battery receiving space is of a consistent shape with the side face of the battery.

8. The battery fixing bracket according to claim 7, wherein the battery is of a columnar shape, and a side face of the battery snap strut that faces the battery receiving space is of an arc shape.

9. The battery fixing bracket according to claim 6, wherein each battery snap strut comprises:

first snap struts located at a middle position of the substrate and positioned between four adjacent battery receiving spaces, the connection hole being located in the first snap struts;

second snap struts located at an edge position of the substrate and having a shape that is half of the first snap strut; and third snap struts located at four corners of the substrate and having a shape that is ¼ of the first snap strut, the snap strips and the snap grooves being located at the third snap struts.

10. The battery fixing bracket according to claim 9, wherein a raised portion is formed at a top end of the first snap strut, and the raised portion has an anti-rotation structure.

11. The battery fixing bracket according to claim 10, wherein the anti-rotation structure is a circular sector shaped or annular sector shaped protrusion.

12. The battery fixing bracket according to claim 9, wherein connection portions are formed at an outside of the second snap strut.

13. A battery pack, comprising an upper cap assembly and a lower cap assembly formed by a battery fixing bracket according to claim 1, the upper cap assembly and the lower cap assembly being aligned oppositely and fixed via screws in the connection holes;

batteries are disposed between the upper cap assembly and the lower cap assembly, and pole ends of the batteries are received in the battery receiving spaces of the upper cap assembly and the lower cap assembly respectively; current-carrying sheets are disposed between the batteries and the upper cap assembly as well as between the batteries and the lower cap assembly, and electrodes of the batteries are welded to the current-carrying sheets, and insulation sheets are attached to the upper cap assembly.

14. The battery pack according to claim 13, wherein each current-carrying sheet and each insulation sheet have a shape and an area consistent with those of the corresponding battery fixing bracket.

15. The battery pack according to claim 13, wherein the battery pack has connection strips that are connected and fix the corresponding connection portions at the edges of the upper cap assembly and the lower cap assembly relative to each other.

* * * * *